Nov. 7, 1967   H. L. McCOMBS, JR   3,350,880
GAS TURBINE COMBUSTION ENGINE FUEL CONTROL
Filed Sept. 3, 1965   7 Sheets-Sheet 7
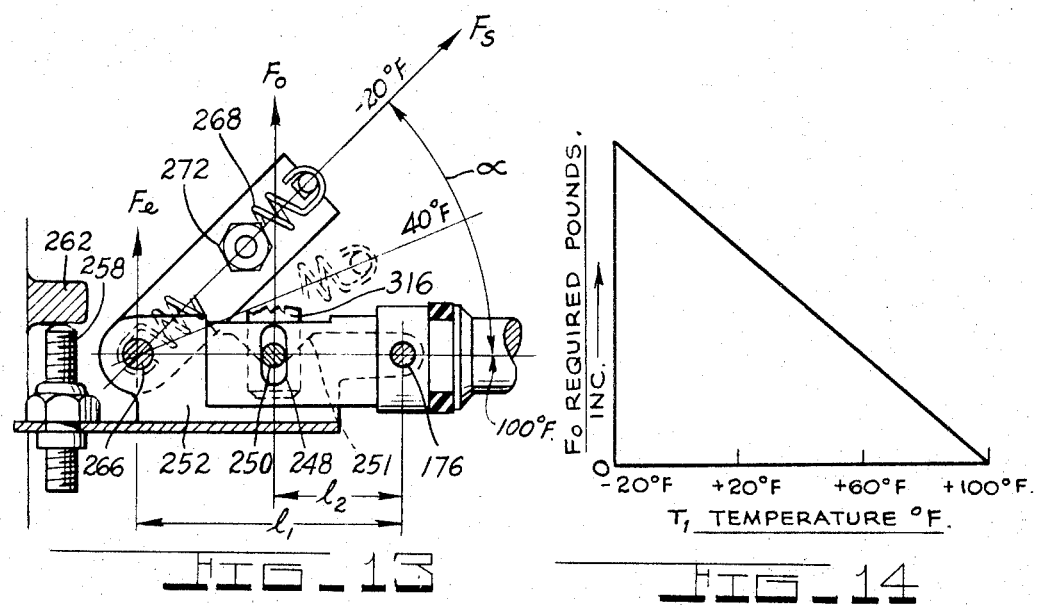
FIG_13
FIG_14
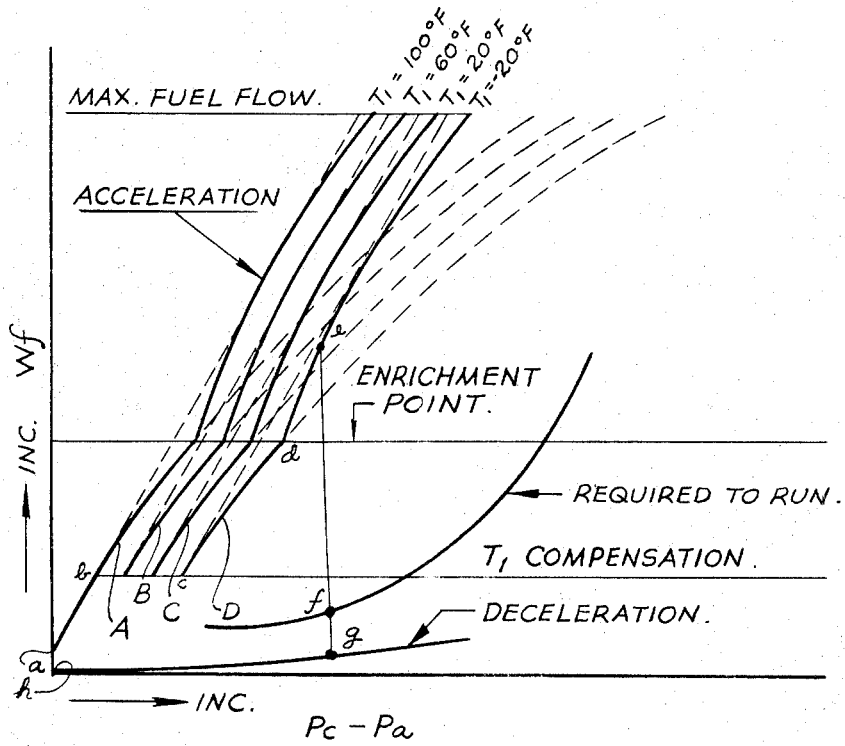
FIG_15
INVENTOR.
HOWARD L. McCOMBS JR.
BY
Gordon N. Cheney
AGENT.

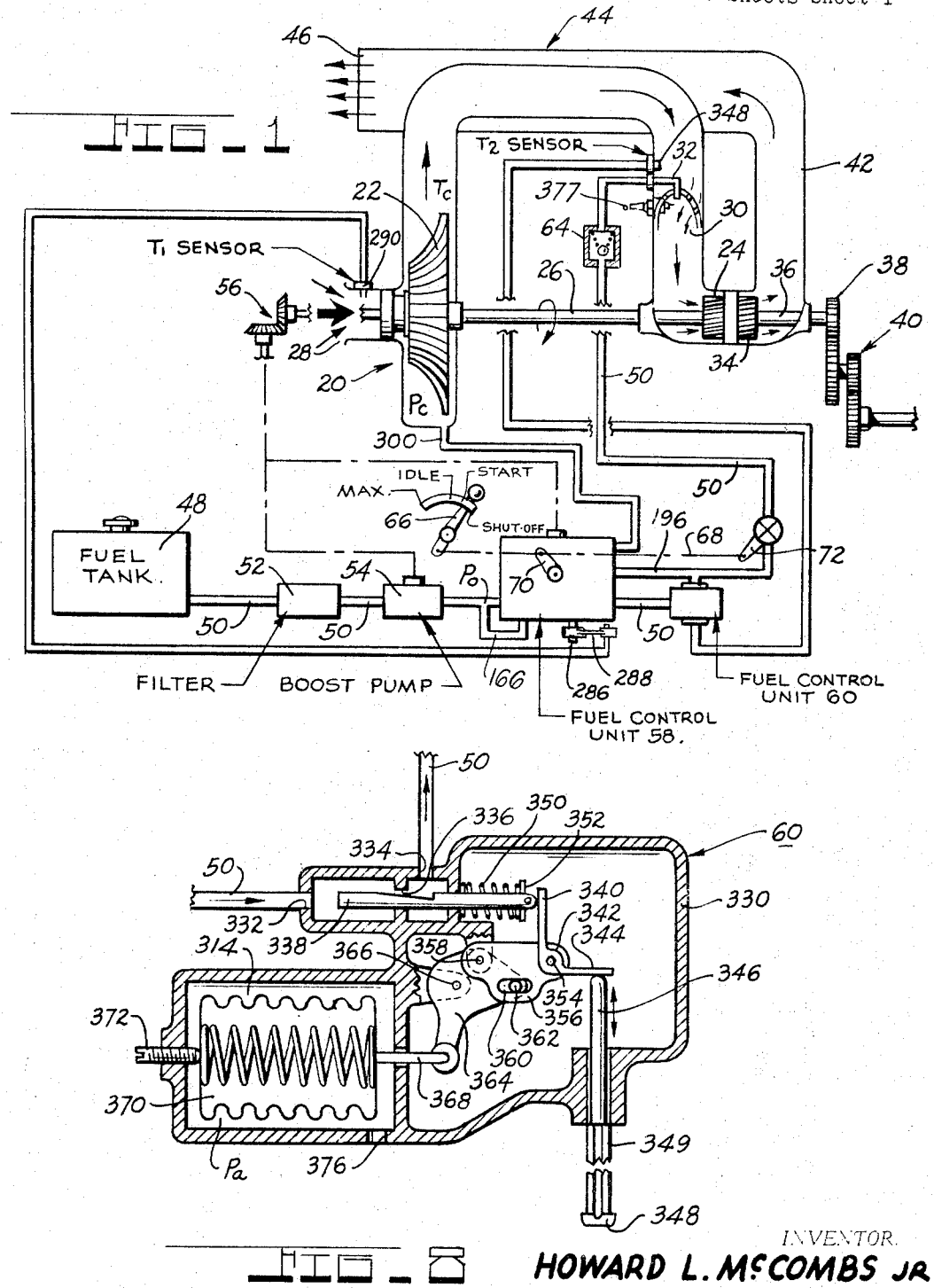

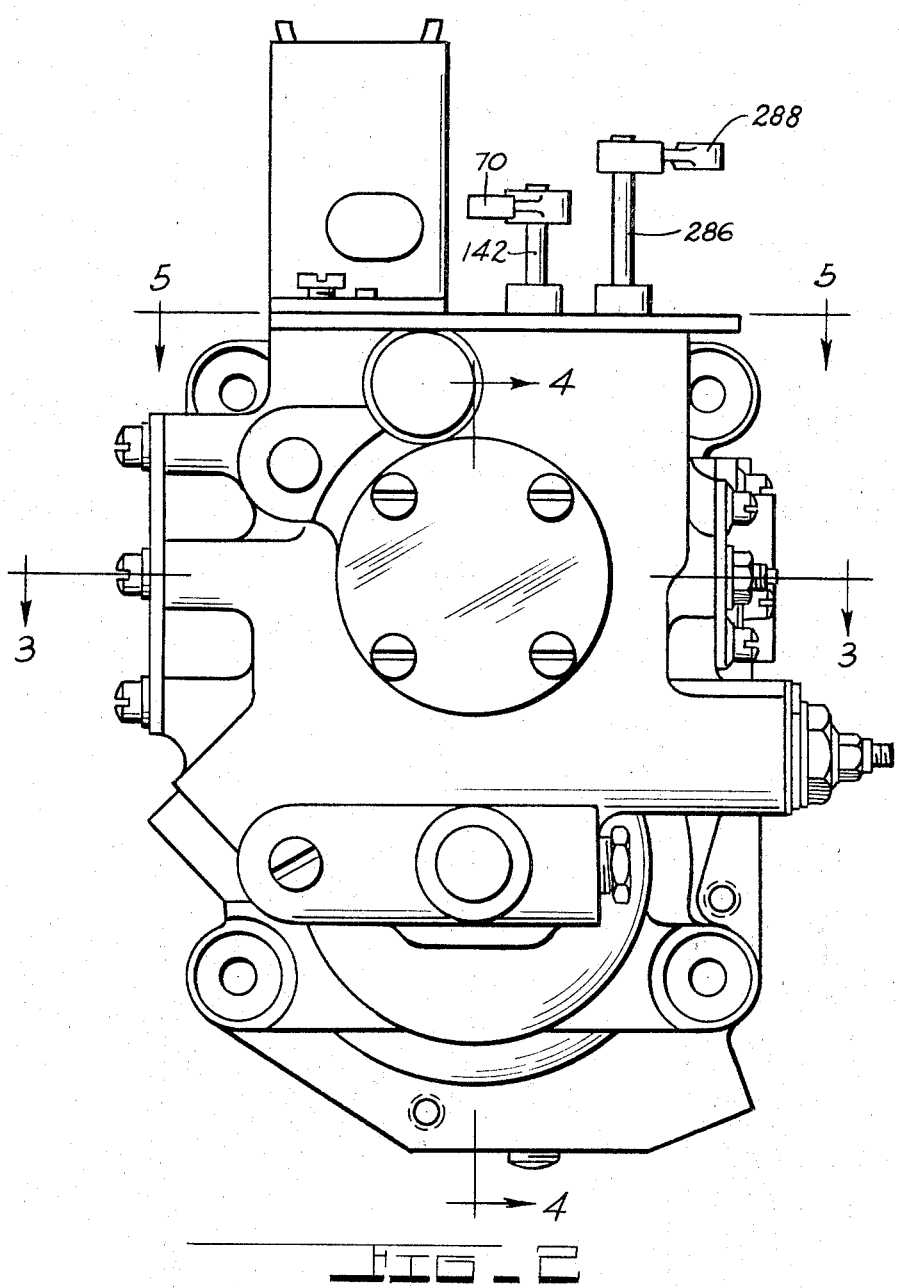

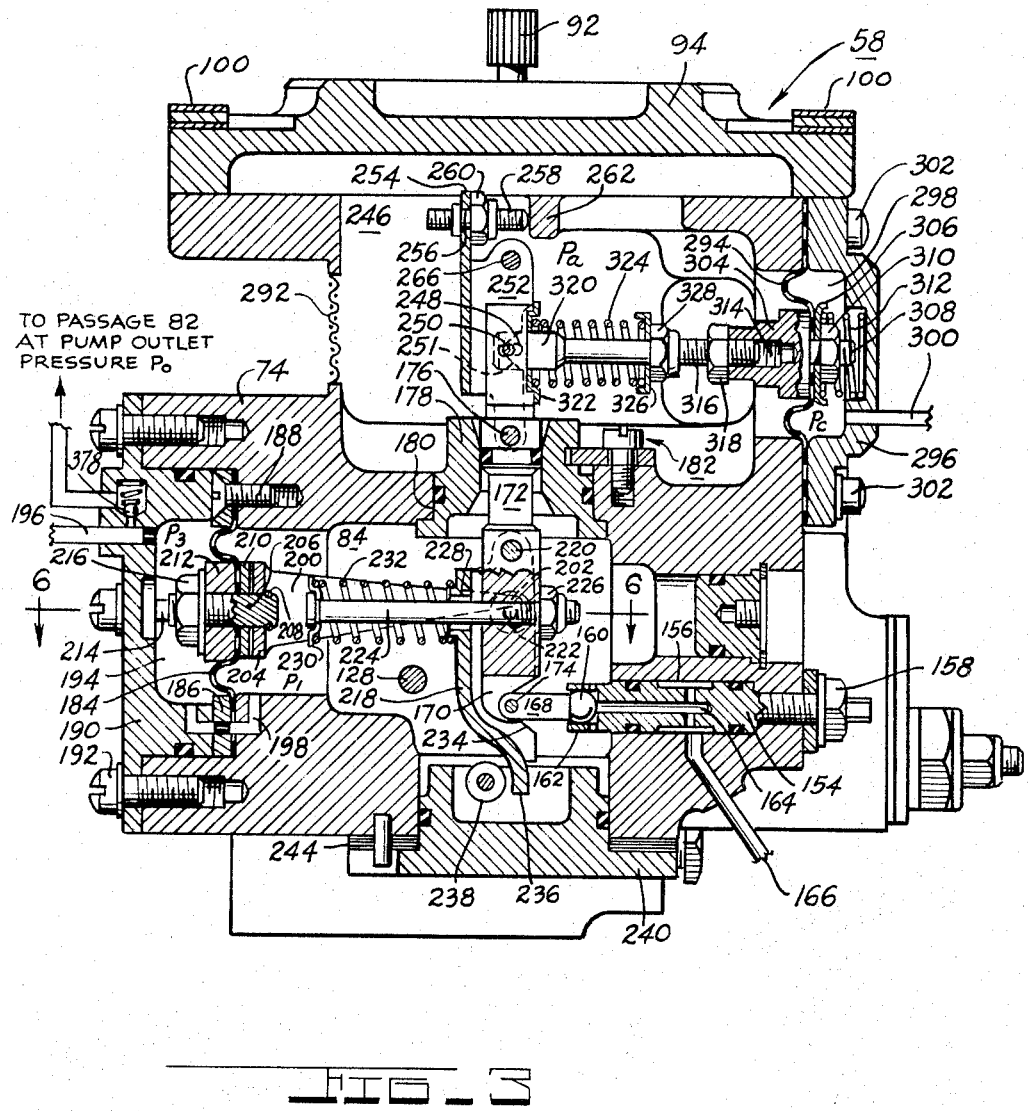
FIG_3

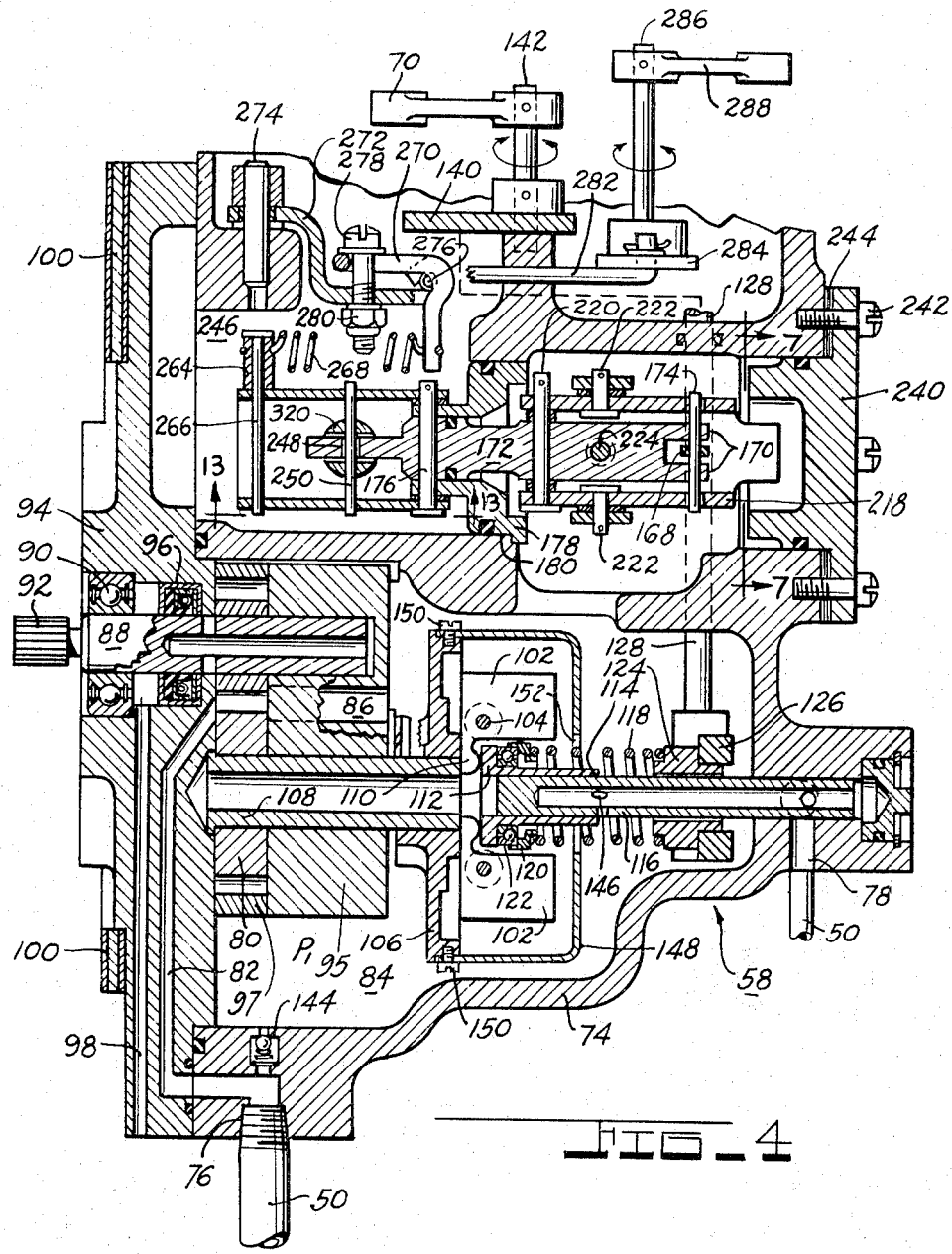
FIG_4

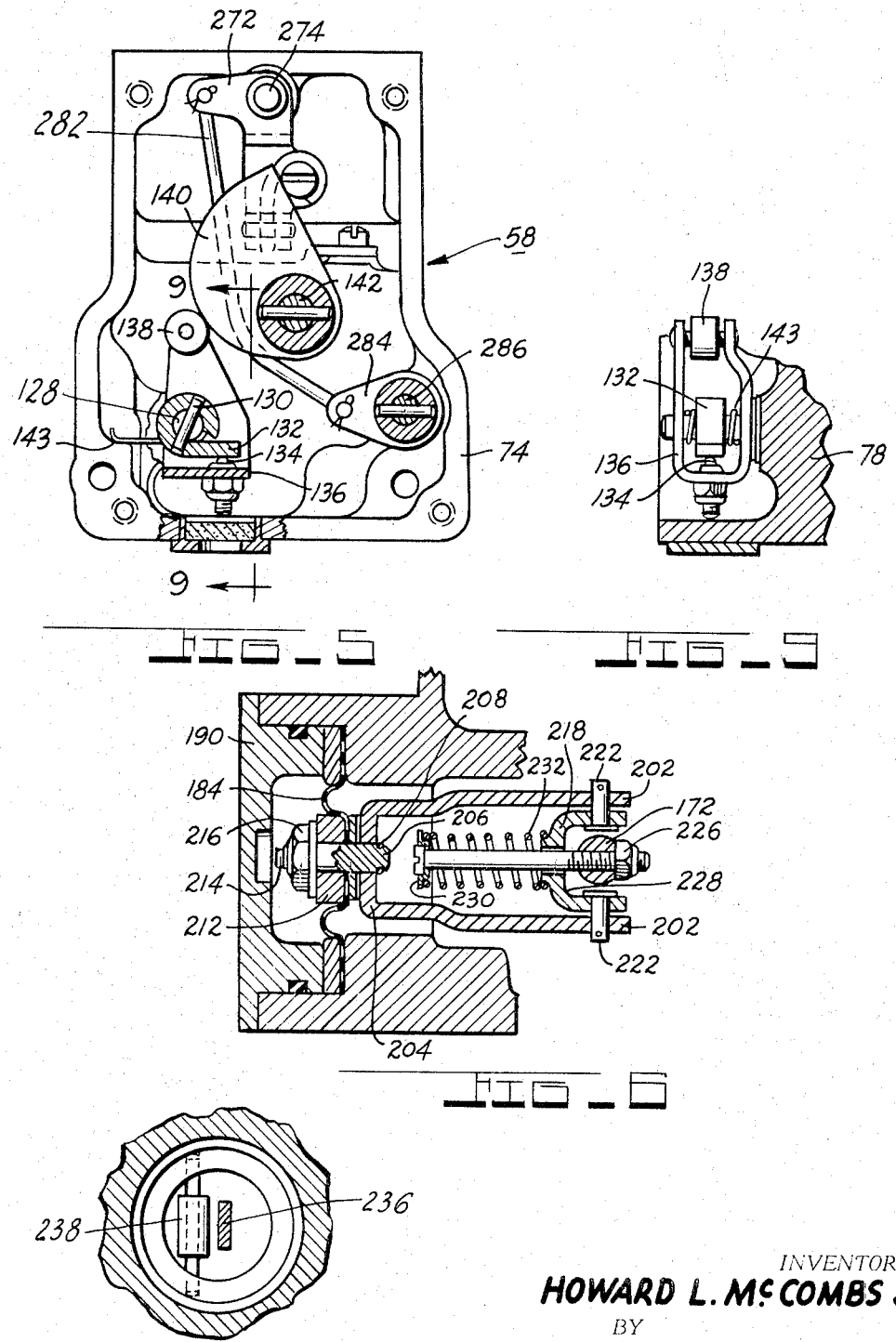

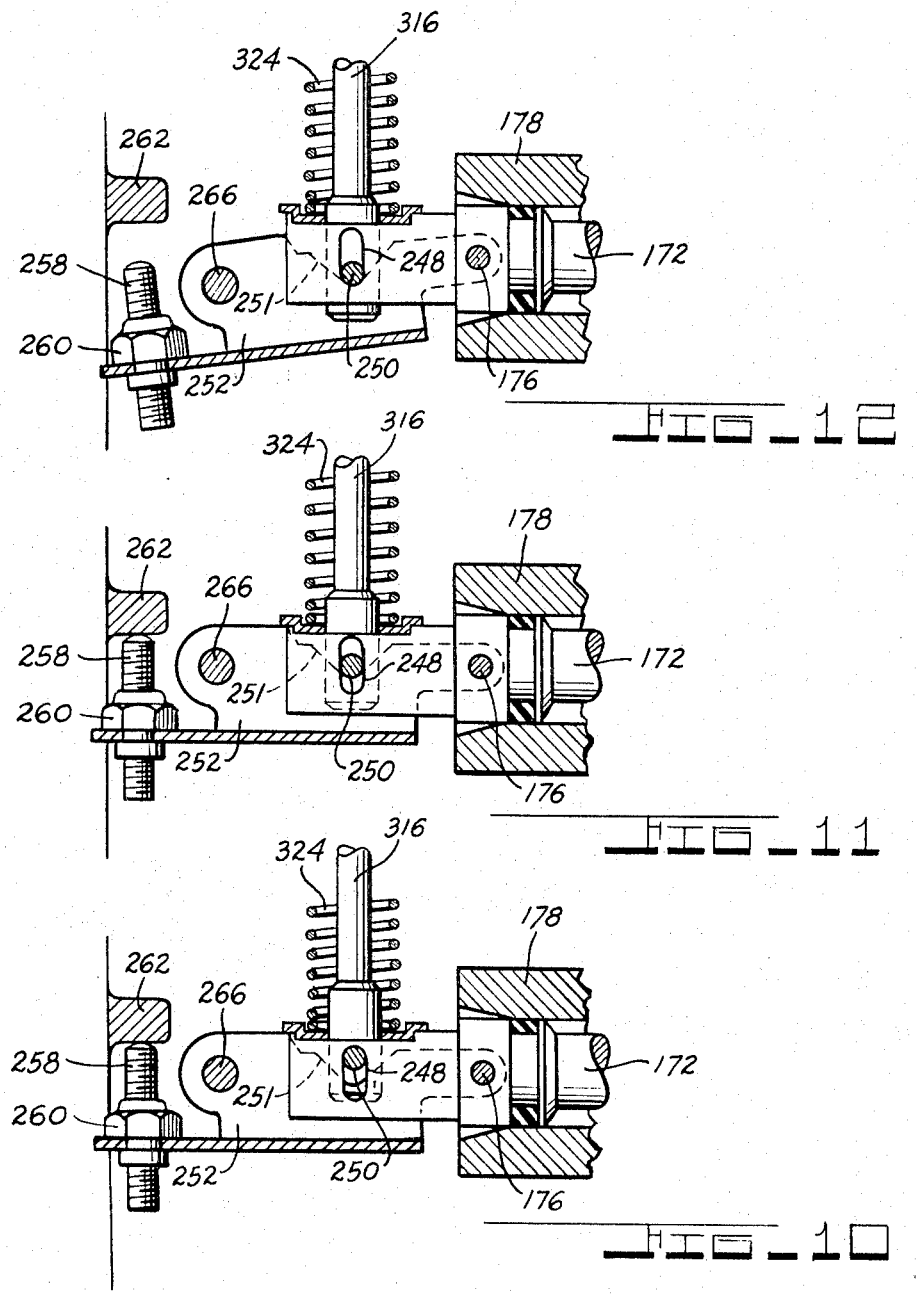

United States Patent Office 3,350,880
Patented Nov. 7, 1967

3,350,880
GAS TURBINE COMBUSTION ENGINE
FUEL CONTROL
Howard L. McCombs, Jr., South Bend, Ind., assignor to
The Bendix Corporation, a corporation of Delaware
Filed Sept. 3, 1965, Ser. No. 484,896
13 Claims. (Cl. 60—39.28)

ABSTRACT OF THE DISCLOSURE

Fuel control apparatus having a plurality of fuel metering valves in series flow relationship and responsive to variable conditions of operation for establishing an effective fuel metering area across which a variable pressure drop is maintained by a fuel by-pass valve. The fuel by-pass valve is actuated by a variable condition responsive member through a force transmitting lever having lost motion connections with a plurality of additional variable condition responsive members which become effective to load the lever at corresponding predetermined positions of the lever.

---

It is an object of the present invention to provide fuel control apparatus for a gas turbine engine of relatively low horsepower as, for example, that used in ground vehicles.

It is another object of the present invention to provide a gas turbine engine fuel control which is relatively simple in structure and correspondingly rugged and reliable in operation.

It is an important object of the present invention to provide a gas turbine engine fuel control which is capable of accurately metering relatively small or large quantities of fuel throughout the operational speed range of the engine.

It is still another object of the present invention to provide a force transmitting control apparatus for controlling an output force as a function of a plurality of input forces.

Other objects and advantages of the present invention will be apparent from the following description taken with the accompanying drawings wherein:

FIGURE 1 is a schematic representation of a gas turbine engine and fuel system therefor embodying the present invention;

FIGURE 2 is a plan view of the fuel control embodying the present invention;

FIGURE 3 is a sectional view taken on line 3—3 of FIGURE 2;

FIGURE 4 is a sectional view taken on line 4—4 of FIGURE 2;

FIGURE 5 is a sectional view taken on line 5—5 of FIGURE 2;

FIGURE 6 is a sectional view taken on line 6—6 of FIGURE 3;

FIGURE 7 is a partial sectional view taken on line 7—7 of FIGURE 4;

FIGURE 8 is a sectional view taken through the fuel control 60 of FIGURE 1;

FIGURE 9 is a sectional view taken on line 9—9 of FIGURE 5;

FIGURES 10, 11 and 12 are enlarged sectional views of a portion of FIGURE 3 wherein the relative positions of certain control levers are shown for engine starting operation, temperature compensation and engine acceleration operation, respectively;

FIGURE 13 is a sectional view in enlarged form taken on line 13–13 of FIGURE 4;

FIGURE 14 is a graph showing the relationship between the force exerted by the temperature compensating spring and the compressor inlet air temperature;

FIGURE 15 is a series of curves showing the fuel flow, $W_f$, versus compression air pressure differential, $P_c$–$P_a$ for various compressor air inlet temperatures, $T_1$ and the fuel enrichment effect imposed thereon.

Referring to FIGURE 1, numeral 20 designates a gas turbine engine having an air compressor 22 driven by a turbine 24 via a rotatably mounted shaft 26. The compressor 22 receives air at pressure $P_1$ via inlet 28 and discharges air at pressure $P_c$ which passes into one or more combustion chambers 30 where fuel is injected into the air by an associated fuel nozzle 32. The resulting hot motive gases pass through turbine 24 driving the same and through a power turbine 34 fixedly secured to a rotatably mounted shaft 36. Power is extracted for external use via a gear 36 fixed to shaft 36 and drivably connected to gear train 40. The relatively high temperature exhaust gases from power turbine 34 are channeled via duct 42 through a heat exchanger 44 where a significant portion of the heat energy of the exhaust gases is transferred to the air pressurized by compressor 22 thereby increasing the temperature of the latter and decreasing the temperature of the exhaust gases which pass through an outlet 46 to the atmosphere.

One or more fuel nozzles 32 are supplied fuel from a fuel tank 48 via a conduit 50 which includes a filter 52, a boost pump 54 connected to be driven by shaft 26 through a suitable gear and shafting arrangement generally indicated by 56, fuel control units 58 and 60, a fuel shut off valve 62 and pressurizing valve 64. A control lever 66 movable over a range of positions including shut off, start, idle and maximum is connected via link 68 to actuate levers 70 and 72 associated with fuel control unit 58 and shut off valve 62, respectively.

Referring to FIGURES 3 to 7 inclusive, which show the internal features of fuel control 58, numeral 74 designates a casing having a fuel inlet port 76 connected to receive fuel at boost pump discharge pressure $P_o$ via passage 50 and a fuel outlet port 78 connected to passage 50 leading to fuel nozzles 32. A gear type positive displacement fuel pump 80 receives fuel via a passage 82 leading from inlet port 76 and discharges fuel at pump discharge pressure $P_1$ to a chamber 84 via a passage 86. The pump 80 is driven by a shaft 88 rotatably mounted by sealed bearing 90 and provided with a splined end portion 92 connected to the engine driven gears and shafts 56. The bearing 90 is mounted on a support plate 94 which also rotatably supports the meshing gears of pump 80 and is suitably secured to casing 74 by conventional fastening means such as bolts, not shown. The gear pump 80 includes an end plate 95 which abuts a spacing member 97 surrounding the pump gears and bearing against support plate 94 thereby establishing clearance to permit rotation of the pump gears. Fastening means, not shown, such as bolts or the like extend through end plate 95 and spacing member 97 into threaded engagement with support plate 94 to clamp end plate 95 and spacing member 97 in fixed relative positions. Conventional sealing means generally indicated by 96 and mounted in support plate 94 serves as a seal against leakage of fuel from pump 80 past shaft 88. The support plate 94 is adapted to be secured to the engine by any suitable fastening means such as bolts, not shown. Leakage of oil past bearing 90 and/or leakage of fuel past seal 96 is vented overboard via a passage 98 formed in support plate 94. A heat insulating pad 100 suitable material separates the support plate 94 from the engine block in its mounted position relative thereto.

The chamber 84 contains a pair of centrifugal speed weights 102 pivotally secured by pins 104 to a rotatable support 106 which is fixed to one end of a shaft 108. The opposite end of shaft 108 is splined to one of the gears of pump 80 and rotatable therewith. Arms 110 integral with weights 102 bear against a flanged end 112 of a tubular member 114 which is slidably carried for axial movement on a tubular member 116 fixedly secured to casing 78. The speed weights 102 are loaded by the force of a compression spring 118, one end of which bears against a spring retainer 120 mounted on the outer race of a bearing 122, the inner race of which is supported by tubular member 114. The opposite end of spring 118 bears against a spring retainer 124 surrounding tubular member 116 and movable axially therealong. The spring retainer 124 is engaged by a forked lever 126 which straddles tubular member 116 and is fixedly secured to one end of a shaft 128 rotatably mounted in casing 74. Referring to FIGURE 5, the opposite end of shaft 128 is secured by a pin 130 to a follower member 132 which bears against an adjustable stop 134 secured to a U-shaped bracket 136 which straddles follower member 132 and is provided with openings in the parallel arm portions thereof through which shaft 128 extends. A roller 138 rotatably mounted to the free ends of bracket 136 bears against a cam 140 pinned to and rotatable with a shaft 142 rotatably mounted on casing 74. The shaft 142 is secured to lever 70 and actuated thereby in response to movement of control lever 66. A spring 143 suitably connected to follower member 132 serves to load the same in a clockwise direction as viewed in FIGURE 5 thereby augmenting the governor spring 118 which urges follower 132 into engagement with stop 134 which, in turn, loads roller 138 against cam 140.

A spring loaded relief valve 144 responsive to the fuel pressure $P_1$ in chamber 84 serves to vent chamber 84 to passage 82 at pressure $P_o$ at a predetermined maximum allowable value of pressure $P_1$.

The tubular member 114 is actuated by the speed weights 102 in response to engine speed or the compression spring 118 in response to the position of cam 140 depending upon the force unbalance therebetween causing tubular member 114 to move relative to orifices 146 thereby increasing or decreasing the effective flow area of the same to adjust fuel flow accordingly.

A cover member 148 surrounding speed weights 102 is secured to support 106 by suitable fastening means such as bolts 150 and is provided with a central opening 152 concentric with spring 118. The cover member 148 tends to rotate the fuel contained therein which surrounds speed weights 102 thereby reducing turbulent fuel and any corresponding undesirable effect thereof on the speed weights 102 during rotation of the latter as will be understood by those skilled in the art.

The fuel pressure $P_1$ in chamber 84 is regulated according to the quantity of fuel vented from chamber 84 back to the inlet of fuel pump 80. To this end, there is provided by-pass valve mechanism including a body portion 154 secured in a bore 156 in casing 74 by a locknut 158 threadedly secured thereto. A ball valve 160 caged in a recess 162 in body portion 154 cooperates with the inlet end of a centrally located passage 164 thereby controlling the effective flow area thereof and thus fuel flow therethrough to a conduit 166 leading to conduit 50 at boost pump fuel pressure $P_o$.

A connecting link 168 is secured at one end to ball valve 160 and at the opposite end is pivotally secured intermediate the legs of a bifurcated end portion 170 of a lever 172 by a pin 174 suitably secured to lever 172. The lever 172 extends through and is pivotally secured by a pin 176 to a plug 178 secured in position in an opening 180 in casing 74 by suitable fastening means such as locking member and bolt generally indicated by 182. The lever 172 is adapted to pivot on pin 176 in the plane of FIGURE 3 and is loaded by a force derived from a $P_1$–$P_3$ fuel pressure differential acting across a flexible diaphragm 184 the outermost edge portion of which is secured to casing 74 by a clamping ring 186 and associated screws 188 threadedly engaged with casing 74. A cup-shaped cap 190 is fixedly secured to casing 74 by bolts 192 and together with diaphragm 184 defines a chamber 194 which is vented to conduit 50 upstream from shut off valve 62 via a restricted passage 196 (see FIGURE 1). A restricted passage 198 communicates chamber 84 with chamber 194.

A U-shaped connecting link 200 is provided with parallel legs which may be generally triangular in shape and terminate in hooked ends 202 only one of which is visible in FIGURE 3. The base portion 204 of link 200 is secured to the stem of a retaining member 206 by a snap ring 208. The centermost portion of diaphragm 184 is clamped between a flange 210 integral with member 206 and a washer 212 through which a threaded portion 214 of member 206 extends. A lock nut 216 threadedly engaged with stem 214 clamps the diaphragm 184 securely in position.

An elongated U-shaped lever 218 is pivotally secured to lever 172 by means of a pin 220 extending through lever 172 and through suitable openings in the legs of U-shaped lever 218. Referring to FIGURE 4, each of the legs of U-shaped lever 218 carries a pin 222 extending through suitable openings therein and outwardly from lever 172. Each of the hooked ends 202 of link 200 is adapted to engage an associated pin 222. An adjustable stem 224 threadedly engaged with lever 172 is locked in position relative thereto by a lock nut 226 threadedly engaged with stem 224. The stem 224 passes through a substantially larger diameter opening 228 in the base portion of U-shaped lever 218 and is provided with a spring retainer 230 carried on an enlarged diameter end portion of stem 224. A compression spring 232 interposed between spring retainer 230 and lever 218 is concentric with stem 224 and serves to load lever 218 in a counterclockwise direction about pin 220 as viewed in FIGURE 3 whereupon the pin 174 seats against the bottom of V-shaped slot 234 formed in each of the legs of U-shaped lever 218. A curved extension 236 of U-shaped lever 218 is adapted to contact a stop 238 fixed to a casing 74 access cap 240 suitably secured to casing 74 by bolts 242. Shims 244 removably disposed between cap 240 and casing 74 serve to adjustably position stop 238.

The opposite end of lever 172 extends into a chamber 246 in casing 74 and is provided with an elongated slot 248 through which a pin 250 extends. The end portions of pin 250 extend into associated V-shaped recesses 251 formed in the legs of a U-shaped lever 252. One end of U-shaped lever 252 is pivotally secured to lever 172 by pin 176 which extends through suitable openings in the legs of U-shaped lever 252. The base portion of U-shaped lever 252 is provided with an extenison 254 having a threaded opening 256 in which an adjustable stop member 258 is threadedly engaged and locked in position axially by lock nut 260. The stop member 258 is adapted to engage a fixed stop 262. A spring retainer 264 suitably fixedly secured to U-shaped lever 252 by a pin 266 which extends through suitable openings in the legs of lever 252 is engaged by one end of a tenison spring 268. The opposite end of spring 268 is secured to an L-shaped spring retainer 270 carried by a rotatable lever 272 mounted on a shaft 274 carried by casing 74. The shaft 274 is arranged substantially coaxially relative to pin 266 which retains the opposite end of spring 268. The spring retainer 270 is adapted to pivot on a pin 276 carried by lever 272 the end of which is upset to clamp the pin 276 securely in position thereon. A bolt 278 engaged with one end of spring retainer 270 extends through a suitable opening in lever 272 and may be adjusted axially by lock nut 280 threadedly engaged therewith to cause retainer 270 to pivot about pin 276 relative to lever 272 thereby causing a corresponding adjustment in the tension of spring 268. The lever 272 is actuated by a connecting link 282, one end of which is connected to lever 272 and the opposite end of which is connected to a lever 284 pinned to a shaft 286 rotatably mounted in casing 74. A lever 288 secured to shaft 286 is connected to and actuated by a temperature sensor 290 suitably mounted to the inlet 28 of the compressor and adapted to respond to the compressor inlet air temperature, $T_1$. It will be understood that the temperature sensor 290 is not described in detail since any suitable conventional temperature sensor which provides a position output signal as a function of temperature may be utilized.

Referring to FIGURE 3, the chamber 246 is vented to the atmosphere at pressure $P_a$ via a screened opening 292 in casing 74. A flexible diaphragm 294 secured at its outermost portion to casing 74 by a cap 296 separates chamber 246 at pressure $P_a$ from a chamber 298 at compressor discharge air pressure $P_c$ and responds to the fluid pressure differential $P_c-P_a$ therebetween. A passage 300 communicates chamber 298 with the discharge section of compressor 22. Bolts 302 extend through suitable openings in cap 296 and diaphragm 294 and threadedly engage casing 74 thereby securing diaphragm 294 and cap 296 in position. The centermost portion of diaphragm 294 is clamped between a backup member 304 and a spring retainer 306 through which a threaded stem 308 of backup member 304 extends. A lock nut 310 threadedly engaged with stem 308 clamps diaphragm 294 securely in position between member 304 and retainer 306. A predetermined spring load is applied to diaphragm 294 by spring 312 interposed between spring retainer 306 and cap 296. The backup member 304 is provided with a central threaded bore 314 engaged by a threaded end of a stem 316. A lock nut 318 threadedly engaged with stem 316 serves to lock the latter in position. The opposite forked end 320 of stem 316 straddles lever 172 and carries pin 250 which extends through suitable mating openings in the legs of forked end 320, only one leg of which is visible in FIGURE 3. The stem 316 slidably extends through a spring retainer 322 supported by lever 172. A compression spring 324 interposed between spring retainer 322 and a spring retainer 326 carried by stem 316 serves to preload lever 172. A nut 328 threadedly engaged with stem 316 acts as a stop for spring retainer 326 and may be adjusted to vary the position of the latter and thus the preload exerted by spring 324.

Referring to FIGURE 8 which discloses the internal features of fuel control unit 60, numeral 330 designates a casing having an inlet 332 and an outlet 334 between which is located an orifice 336. A contoured valve 338 slidably carried in orifice 336 serves to vary the effective flow area thereof and thus fuel flow through outlet 334. One end of valve 338 bears against one arm 340 of an L-shaped lever 342, the opposite arm 344 of which bears against the movable output member 346 of a temperature sensor 348 exposed to the air passing from the heat exchanger 44 and entering burner 30 at temperature $T_2$. The temperature sensor 348 is conventional in that the output member 346 occupies a definite position for each temperature $T_2$ by virtue of expansion or contraction characteristics of the sensor 348 in response to temperature variations. The temperature sensor 348 includes a shell 349 having a higher coefficient of expansion than the output member 346, the latter being fixedly secured at one end to shell 349 and slidably contained by shell 349 such that, for a given change in temperature $T_2$, the shell 349 expands axially more than output member 346 thereby providing a positional output signal to which lever 342 responds. A compression spring 350 interposed between casing 330 and a spring retainer 352 secured to valve 338 serves to bias the latter into engagement with arm 340.

The lever 342 is pivotally secured by a pin 354 to a movable support 356 which, in turn, is pivotally secured by a pin 358 to casing 330. An elongated slot 360 formed in support 354 is adapted to slidably receive a pin 362 secured to a lever 364. The lever 364 is pivotally secured to casing 330 by a pin 366 and is actuated by a stem 368 pivotally secured at one end thereto and at the opposite end secured to the movable end of a sealed spring loaded bellows 370. The opposite fixed end of bellows 370 bears against an adjustable support 372 threadedly engaged with casing 330. The bellows 370 is exposed to atmospheric air pressure $P_a$ in chamber 374 which is vented to the atmosphere via port 376.

*Operation*

Assuming the engine is to be started and brought to a selected speed, the control lever 66 is positioned at the selected speed. The cut off valve 62 is actuated to an open position via link 68 which also rotates cam 140 resulting in compression of governor spring 118. The tubular member 114 is biased against weight 102 by spring 118 thereby establishing a maximum opening of orifice 146. The engine is energized by conventional starting means, not shown, capable of rotating the engine to a self-sustaining speed. The cranked engine drives pump 80 causing fuel to be discharged into chamber 84 at pump discharge pressure $P_1$ from which the fuel flows through orifice 146 to to nozzles 32 via conduit 50 and fuel control unit 60, cut off valve 62 and pressurizing valve 64, the latter opening at a predetermined fuel pressure $P_4$ to ensure adequate system pressurization.

The ball valve 160 is urged toward a closed position against body portion 154 to reduce bypass fuel flow therethrough by lever 172 which is loaded in a counterclockwise direction as viewed in FIGURE 3. At the relatively low engine cranking speed during starting the $P_c-P_a$ air pressure differential across diaphragm 294 is relatively low and a preload for starting fuel flow purposes is obtained by spring 312 which through stem 316 and spring 324 loads lever 172 in a counterclockwise direction. To this end, the spring 324 urges lever 172 away from spring retainer 326 such that the pin 250 bears against the one end of slot 248 which results in spring 324 acting as a force transmitting medium of constant length through which the force of spring 312 as well as the relatively small force derived from the low $P_c-P_a$ differential acting across diaphragm 294 during engine cranking is applied to lever 172. The lever 252 is loaded by spring 268 as will be described later which urges stop member 258 into engagement with stop 262 thereby permitting the pin 250 to be lifted out of engagement with the bottom of U-shaped recess 251 as shown in FIGURE 10. It will be understood that the slot 248 is made sufficiently long to permit the pin 250 a predetermined range of movement along slot 248 in response to the force derived from diaphragm 294 and spring 312 before pin 250 engages the bottom of U-shaped recesses 251 to permit normal regulatory movement of ball valve 160. It will be understood that the compression spring 312 may be replaced by a tension spring if a negative preload and corresponding modification in starting fuel flow is desired depending upon the characteristics of the engine.

As mentioned above, the counterclockwise loading of lever 172 by spring 312 results in closing movement of ball valve 160 to reduce bypass fuel flow. The fuel at pump discharge pressure $P_1$ in chamber 84 passes through restricted passage 198 into chamber 194 which may contain trapped air. The trapped air is purged from chamber 194 by the fuel flow passing into chamber 194 and exiting via restricted passage 196 to conduit 50. It will be understood that a slight pressure drop from $P_4$ in conduit 50 to chamber 194 exists during transient flow conditions. However, pressure $P_3$ is substantially equivalent to pressure $P_4$ in conduit 50 such that the fuel pressure drop $P_1-P_3$ sensed by diaphragm 194 is equivalent to the $P_1-P_4$ drop across the governor orifice 146 and fuel control unit 60.

The counterclockwise movement imposed through lever 172 on ball valve 160 is opposed by a clockwise movement derived from the fuel pressure differential $P_1-P_3$ across diaphragm 184 which acts through U-shaped connecting link 200 and pins 222 against lever 172. Thus, the fuel pressure differential $P_1-P_4$ across governor orifice 146 and fuel control unit 60 is regulated as a function of the force input derived from spring 312 and diaphragm 294 exposed to the compressor pressure differential $P_c-P_a$ by the ball valve 160 which responds to the force loading on lever 172 to increase or decrease bypass fuel flow and thus decrease or increase, respectively, fuel pressure $P_1$ accordingly.

Upon reaching a predetermined cranking engine speed, the engine is rendered self-sustaining in operation in response to the combustion process from which hot motive gas is derived to drive turbine 24 at which time the starter is rendered inoperative to drive the engine. It will be understood that the fuel air mixture in chamber 30 is ignited in a conventional manner by an ignition system including igniter plug 377. The compressor pressure differential $P_c-P_a$ increases as the engine speed increases toward selected idle and fuel flow increases along the curved portion $a$ to $b$ of Line A, shown in FIGURE 15. The lines A, B, C, D represent the relationship between fuel flow, $W_f$, and compressor air pressure differential, $P_c-P_a$, as defined by a square root relationship in view of the fuel pressure differential $P_1-P_4$ being controlled as a function of compressor air pressure differential $P_c-P_a$. It will be understood that fuel flow to the nozzles 32 varies in accordance with the relationship $W_f = CA \sqrt{P_1-P_4}$ wherein C designates the conventional flow coefficient, A designates the effective flow area established by governor orifice 146 and orifice 336 and $P_1-P_4$ designates the fuel pressure drop across A. Since the fuel pressure differential $P_1-P_4$ is controlled in proportion to compressor air pressure differential $P_c-P_a$, it can be seen that simple substitution results in $W_f$ varying as a function of the square root of the compressor air pressure differential, $P_c-P_a$ as indicated in FIGURE 15.

The increasing air pressure differential $P_c-P_a$ loads diaphragm 294 causing a progressively increasing force which is transmitted through spring 324 to lever 172. Upon reaching the point $b$ on curve A of FIGURE 15, a compensation for variations in compressor inlet temperature, $T_1$, is introduced by virtue of lever 252 which is loaded by spring 268. Referring to FIGURE 13, it will be noted that lever 272, which rotates about shaft 274 in response to the compressor inlet air temperature, $T_1$, sensed by temperature sensor 290, is adapted to swing the one end of spring 268 attached thereto via spring retainer 270 in an arc about the axis of shaft 274. FIGURE 13 illustrates the relative positions of the lever 272 and one end of spring 268 for a given position of lever 172 with lever 252 fixed accordingly by virtue of stop 258 abutting stop 262. As viewed in FIGURE 13, the spring 268 force is represented by $F_s$ acting through pin 266. The vertical component, $F_e$, of $F_s$ through pin 266 is calculated as $F_s \sin \alpha$. The force acting vertically upward through pin 250 which is on the centerline of diaphragm 294 is therefore $$F_o = F_s \sin \alpha \frac{l_1}{l_2}$$

wherein $l_1$ is the lever arm from pin 176 to pin 266 and $l_2$ is the lever arm from pin 176 to pin 250. Assuming the compressor inlet air temperature, $T_1$, is $-20°$ F., for example, the spring 268 is positioned as shown in FIGURE 13 thereby imposing a corresponding load $F_e$ on pin 266 and thus lever 252 tending to hold stop 258 against stop 262. At a temperature $T_1$ of 100° F. or greater, the swinging end of spring 268 is positioned at one end of its arcuate range of travel whereby the axis of spring 268 is substantially parallel to a line drawn through the axis of pins 176 and 266 as indicated in FIGURE 13. To this end, the stop member 258 may be adjusted to bring the pin 266 in line with the axis of shaft 274 upon which lever 272 pivots. Thus, the spring 268 has little or no load effect, $F_e$, on lever 172 through the limited range of movement of the latter at a temperature $T_1$ of 100° F. or greater. As the force derived from diaphragm 294 increases, the spring 324 is overcome causing the same to compress thereby allowing pin 250 to move along slot 248 while the force continues to act through spring 324 against lever 172. Upon engagement of pin 250 with the bottom of U-shaped recess 251, further movement of pin 250 and stem 316 attached thereto is deterred by the force, $F_o$, derived from spring 268 acting through lever 252.

Referring to FIGURE 15, fuel flow remains at a constant value from point $b$ to point $c$ during which time the pin 250 bears against the bottom of U-shaped recess 251 whereupon the force derived from diaphragm 294 minus the force of spring 324 must become sufficient to overcome the opposing force, $F_o$, derived from spring 268 acting through lever 252 against pin 250 before the lever 252 is actuated lifting stop 258 off stop 262. With the force $F_o$ overcome in the abovementioned manner, the lever 252 is actuated about pin 176 permitting pin 250 to engage the end of slot 248 as shown in FIGURE 12 whereupon the force transmitted through pin 250 to lever 172 augments the existing force applied to lever 172 by spring 324 which results in corresponding actuation of ball valve 160. Thus, the fuel pressure differential $P_1-P_4$ is modified accordingly causing fuel flow to the nozzles to increase along the line from $c$ to $d$ in FIGURE 15. At point $d$ an increase in fuel flow for a given increase in compressor air pressure differential $P_c-P_a$ is introduced to provide an enriched schedule. To this end, the spring 232 which bears against stem 224 fixed to lever 172 and against lever 218 thereby holding the pin 174 into engagement with the bottom of U-shaped slot 234 is overcome by the force exerted by diaphragm 284 on pins 222 attached to lever 218. At point $d$, the force derived from diaphragm 184 which is related in the heretofore mentioned manner to the opposing force generated by the air pressure differential $P_c-P_a$ across diaphragm 294 both of which act through lever 172 to control ball valve 160 has urged the extension 236 of lever 218 into contact with stop 238. It will be noted that, with the pin 174 in engagement with the bottom of the U-shaped slot, the force derived from diaphragm 184 acts through an effective lever arm equal to the distance between the axis of pin 176 and the axis of stem 224. However, when spring 232 is overcome permitting extension 236 to engage stop 238, the fulcrum for lever 218 is defined by stop 238 and the force applied by diaphragm 184 to lever 172 becomes equal to the force derived from diaphragm 184 times the effective lever arm of lever 218 between stop 238 and the axis of stem 224 divided by the effective lever arm of lever 218 between stop 238 and pin 220 which necessitates a larger force output from diaphragm 184 to maintain the lever 172 in balance for a given input force from diaphragm 294 acting on lever 172. Thus, at the enrichment point $d$, a given incremental increase in compressor discharge air pressure differential $P_c-P_a$, results in a corresponding larger incremental increase in the opposing fuel pressure differential $P_1-P_3$ which, in turn, controls fuel flow along the curve from point $d$ to point $e$. Point $e$ represents the governor break point at which the force of governor spring 118 is overcome by the force of weights 102 and the tubular member 114 moves into engagement with governor orifice 146 to reduce the flow area thereof producing a drop in fuel flow from point $e$ to point $f$ on the required to run curve. At point $f$, the forces of governor spring 118 and weights 102 balance thereby regulating fuel flow to maintain the selected speed designated by point $f$. Subsequent accelerations to higher engine speeds result in fuel flow progressing along the curve from point $d$ to the governor break point corresponding to the selected higher speed whereupon governor action stabilizes fuel flow as necessary to maintain the selected speed as mentioned heretofore.

The slope of the enriched portion of the curve may be increased or decreased by removing or adding shims 244 to adjust the position of stop 238 which, in turn, changes the ratio relationship between the lever arm from stop 238 to the axis of stem 224 and the lever arm from stop 238 to the pin 220. Also the point at which enrichment occurs such as point d may be varied by suitable adjustment of lock nut 226 which results in a corresponding change in the preload of spring 232.

The engine is decelerated by actuating the control lever 66 to a lower than existing speed whereupon the force of weights 102 overcomes the reduced load of spring 118 causing tubular member 114 to overlap orifice 146 thereby reducing fuel flow through conduit 50 to the engine accordingly. Since the forces acting on lever 172 during a deceleration act in reverse of that during an acceleration, the fuel pressure differential $P_1-P_4$ decreases accordingly and the lower speed is reached at which governor operation takes over to maintain said lower speed. When required, a minimum fuel flow is maintained during engine deceleration by the restricted passages which are in parallel flow relationship with governor orifice 146 thereby providing a deceleration schedule which is a function of the fixed flow areas of passages 196 and 198 and the decreasing pressure differential $P_1-P_4$ thereacross as shown by the curve g to h. In continuous ignition engines, a minimum fuel flow may not be required in which case the parallel circuit may be omitted.

The fuel flow to the nozzles 32 is controlled over the operating range of the engine by the valve 338 which is in series flow relationship with governor orifice 146. The valve 338 is positioned as a function of burner inlet air temperature, $T_2$, to which sensor 348 is exposed. Movement of output member 346 in response to sensor 348 exposed to temperature $T_2$, causes lever 342 to pivot about pin 354 which, in turn, results in axial movement of valve 338 and a corresponding change in the area of orifice 336. For a given position of output member 346, the position of valve 338 is modified as a function of atmospheric air pressure $P_a$ by the bellows 370. Assuming an increase in air pressure $P_a$, the bellows 370 will contract accordingly causing clockwise movement of lever 364, as viewed in FIGURE 8, which, in turn, by virtue if pin 362 sliding in slot 360, causes movable support 356 to pivot clockwise about pin 358. The lever 342 being pivotally supported by pin 354 attached to support 356 is tilted from the position shown in FIGURE 8 causing valve 338 to move toward the left thereby increasing the flow area of orifice 336. A decrease in air pressure $P_a$ which results in expansion of bellows 370 causes opposite movement of lever 364 and support 356 from that mentioned above, which, in turn, causes valve 338 to move toward the right thereby decreasing fuel flow. The fixed end of bellows 370 may be positioned by adjusting the support 372 as desired for calibration purposes.

A maximum fuel flow is established by a spring loaded valve 378 connected to vent passage 196 to boost pump outlet pressure $P_o$ at a predetermined fuel pressure $P_4$.

It is considered within ordinary engineering skill to install suitable conventional fluid seals where necessary to seal one fluid pressure from another and to provide access openings in the casing where required to permit installation or removal as well as adjustment of adjustable portions of the internal structure shown and described.

Various changes and modifications in the structure shown and described may be made by those persons skilled in the art without departing from the scope of applicant's invention as defined by the following claims:

I claim:

1. Fuel control apparatus for a combustion engine having a combustion chamber, said fuel control apparatus comprising:

a control lever for controlling the operation of the engine;
a source of pressurized fuel;
a fuel conduit connected to supply pressurized fuel from said source to the combustion chamber;
governor means including a valve in said conduit responsive to the position of said control lever and engine speed for controlling fuel flow to maintain a selected engine speed;
first valve means operatively connected to said fuel conduit for controlling the fuel pressure in said conduit and thus the flow of fuel therethrough;
second valve means responsive to a first variable condition of engine operation affecting engine power output operatively connected to said fuel conduit downstream from said governor valve for controlling fuel flow as a function of said variable condition;
control means including fluid pressure responsive means responsive to the fuel pressure differential across said governor valve and said second valve means operatively connected to said first valve means for actuating the same, means responsive to a second variable condition of engine operation affecting engine power output operatively connected to said first valve means for actuating same in opposition to said fluid pressure responsive means, and means responsive to a third variable condition of engine operation affecting engine power output operatively connected to said first valve means for modifying the effect of said second condition responsive means on said first valve means;
said fuel flow through said fuel conduit being controlled by said first valve means, respectively, as a function of said first and second variable conditions of engine operation during governing operation at a selected engine speed as well as an acceleration to a selected higher speed.

2. Fuel control apparatus for a combination engine having a combustion chamber and an air compressor, said fuel control apparatus comprising:

a control lever for controlling the operation of the engine;
a source of pressurized fuel;
a fuel conduit connected to supply pressurized fuel from said sorce to the combustion chamber;
governor means including a valve in said conduit and responsive to the position of said control lever and engine speed for controlling fuel flow to maintain a selected speed;
first valve means operatively connected to said fuel conduit for controlling the fuel pressure upstream from said governor valve;
second valve means responsive to first and second variable conditions of engine-operation affecting engine power output operatively connected to said fuel conduit in series flow relationship with said governor valve for controlling fuel flow through said conduit;
control means including first pressure responsive means responsive to the fuel pressure differential across said governor valve and said second valve means operatively connected to said first valve means for actuating the same, second pressure responsive means responsive to a compressor generated air pressure operatively connected to said first valve means for actuating the same in opposition to said first pressure responsive means, and temperature responsive means responsive to compressor inlet air temperature operatively connected to said first valve means for actuating the same in conjunction with said second pressure responsive means;
said fuel flow through said fuel conduit being controlled by said first valve means and said second valve means during governing operation at a selected engine speed as well as an acceleration to a selected higher engine speed.

3. Fuel control apparatus for a combustion engine having a combustion chamber, said fuel flow control apparatus comprising:

a control lever for controlling the operation of the engine;
a source of pressurized fuel;
a fuel conduit connected to supply pressurized fuel from said source to the combustion chamber with governor valve means therein responsive to said control lever and engine speed;

valve means operatively connected to said fuel conduit for controlling fuel flow therethrough;

first lever means operatively connected to said valve means for controlling the position thereof and thus fuel flow through said fuel conduit;

first means responsive to a first variable condition of engine operation associated with engine power output operatively connected to said first lever means for loading the same with a first force which varies as a function of said first variable condition of engine operation;

second lever means pivotally supported for movement and responsive to a second variable condition of the engine to apply a second force to said first lever means which modifies said first force;

third lever means responsive to the fuel pressure in said fuel conduit operatively connected to said first lever means for loading the same with a third force which varies with the fuel pressure in said fuel conduit in opposition to said first force.

4. Fuel flow control apparatus as claimed in claim 3 wherein:

said first lever means is pivotally secured to a fixed support and provided with a slotted portion therein spaced from said fixed support;

said operative connection between said first means and said first lever means includes a pin secured to a stem and slidably carried in said slotted portion;

a retainer secured to said stem;

spring means interposed between said retainer and said first lever means for urging said stem and said first lever means apart to effect engagement of said pin with one end of said slotted portion;

said second lever means being pivotally supported on said fixed support and engageable with a fixed stop for limiting pivotal movement of said second lever means toward said first lever means;

said spring means being overcome by a predetermined force exerted by said first means whereupon said pin is actuated along said slotted portion into engagement with said second lever means whereupon said second force acts in opposition to said first force to maintain a substantially constant input force loading on said first lever means and thus regulate fuel flow at a substantially constant value until said first force increases to a predetermined value.

5. Fuel flow control apparatus for a combustion engine having a combustion chamber, said fuel flow control apparatus comprising:

a source of pressurized fuel;

a fuel conduit connected to supply pressurized fuel from said source to the combustion chamber;

valve means operatively connected to said fuel conduit for controlling fuel flow therethrough;

force transmitting means operatively connected to said valve means for actuating the same to control flow through said fuel conduit accordingly;

first means responsive to a first variable condition of engine operation associated with engine power output operatively connected to said force transmitting means and adapted to apply a variable control force thereto;

second means responsive to a second variable condition of engine operation associated with engine power output operatively connected to said first means and adapted to apply a resisting force thereto at a predetermined value of said variable control force in opposition to the latter force;

third means responsive to a fuel pressure indicative of fuel flow through said fuel conduit operatively connected to said force transmitting means for applying a force thereto in opposition to said variable control force, and fourth means operatively connected to said force transmitting means and said third means for modifying the force derived from the latter which acts on said force transmitting means to effect an increase in fuel flow for any given value of said variable control force above a predetermined value thereof.

6. Fuel flow control apparatus for a combustion engine having a combustion chamber, said fuel flow control apparatus comprising:

a control lever for controlling the operation of the engine;

a source of pressurized fuel;

a fuel conduit connected to supply pressurized fuel from said source to the combustion chamber;

governor means including first variable area valve means in said fuel conduit operatively connected to said control lever and responsive to engine speed for controlling fuel flow to maintain a selected engine speed in accordance with the position of said control lever;

second variable area valve means in said fuel conduit in series flow relationship with said first variable area valve means and responsive to a first variable condition of engine operation associated with engine power output for controlling fuel flow through said fuel conduit;

third variable area valve means operatively connected to said fuel conduit for controlling the fuel pressure differential across said first and second variable area valve means;

control means responsive to second and third variable conditions of engine operation associated with engine power output operatively connected to said third valve means for controlling the operation of the same.

7. Fuel flow control apparatus as claimed in claim 6 wherein:

said control means includes lever means pivotally carried by a fixed support and having first and second lever arms extending from said fixed support;

a first lever pivotally secured to said fixed support and loaded by a force which varies as a function of said second variable condition of engine operation;

stop means engageable with said first lever for limiting movement of said first lever toward said lever means;

a slot formed in said first lever arm;

a stem provided with a pin at one end slidably carried in said slot to provide a lost motion connection between said stem and said lever means;

means responsive to said third variable condition of engine operation for imposing a force on said stem;

spring means interposed between said stem and said lever means for urging the same apart to effect engagement of said pin with one end of said slot;

fluid pressure responsive means responsive to the fuel pressure differential across said first and second variable area valve means operatively connected to said second lever arm for applying a force thereto in opposition to the force acting through said first lever arm;

said spring means being overcome at a predetermined force imposed on said stem as a function of said third variable condition of engine operation which actuates said pin along said slot into engagement with said first lever whereupon the opposing force thereof restricts movement of said stem until the force imposed on said stem as a function of said third variable condition of engine operation increases to a predetermined value.

8. Fuel flow control apparatus as claimed in claim 6 wherein the combustion engine includes an air compressor and wherein:

said first variable condition of engine operation includes an air pressure which varies as a function of altitude of engine operation;

said second variable condition of engine operation is the air pressure differential between the compressor inlet and outlet, and said third variable condition of engine operation is the temperature of the air entering the compressor inlet.

9. Control apparatus for controlling an output condition as a function of an input condition and for modifying the effect of said input condition at a predetermined value of said output condition comprising:

first means for controlling the output condition;

force transmitting lever means operatively connected to said first means and responsive to an input force which varies as a function of the input condition;

second means operatively connected to said force transmitting lever means and responsive to the controlled output condition for loading said lever means with a balancing force in opposition to said input force;

second lever means pivotally secured to said force transmitting means and adapted to transmit said balancing force derived from said second means to said force transmitting lever means;

a retaining member secured to said force transmitting lever means;

a first stop member secured to said force transmitting lever means;

resilient means interposed between said retaining member and said second lever means for urging said second lever means into engagement with said first stop member; and a second stop member adjustably secured to a fixed support and spaced apart from said force transmitting lever means;

said resilient means being overcome in response to a predetermined force derived from said second means to effect disengagement of said second lever means from said first stop member and engagement thereof with said second stop member to effectively reduce said balancing force applied to said force transmitting means by said second lever means for any given value of the force derived from said second means above said predetermined value.

10. Control apparatus for controlling an output condition as a function of a first variable input condition and for modifying the effect of said first input condition as a function of a second variable input condition comprising:

means for controlling the output condition;

force transmitting lever means pivotally secured to a fixed support and operatively connected to said means for actuating the same;

means responsive to the first variable input condition operatively connected to said force transmitting means for loading the latter with a force which varies as a function of the first variable input condition;

means responsive to the output condition operatively connected to said force transmitting lever means for loading the latter with a force which varies with changes in the output condition in opposition to force derived from said first variable input condition responsive means;

a lever pivotally secured to said fixed support for movement relative to said force transmitting lever means;

means responsive to the second variable input condition operatively connected to said lever for loading the latter with a force which varies as a function of the second variable input condition;

a slot formed in said force transmitting lever means;

a stem connected to said means responsive to the first variable input condition and provided with an end portion slidably carried in said slot to provide a lost motion connection;

spring means operatively connected to said stem and said force transmitting lever means for urging the same apart to effect engagement of said end portion with one end of said slot;

said spring means being overcome at a predetermined force imposed on said stem by said first variable input condition responsive means whereupon said pin is carried along said slot into engagement with said lever which opposes further movement of said stem until the force derived from said first variable input condition responsive means increases to a predetermined value.

11. Control apparatus as claimed in claim 10 wherein said means responsive to said second variable input condition includes:

a spring retaining member pivotally secured to a fixed support;

sensing means responsive to said second variable input condition operatively connected to said spring retaining member for actuating the same;

spring means operatively connected to said lever and said spring retaining member for imposing a load on the former which varies in accordance with the position of said spring retaining member.

12. Control apparatus as claimed in claim 11 wherein said spring means comprises a tension spring having one end secured to said spring retaining member and the opposite end secured to said lever;

said one end of the tension spring being displaced in an arc thereby causing an angular displacement of the axis of said tension spring relative to the longitudinal axis of said lever and a corresponding modification in the effective force thereof acting on said lever in opposition to the force derived from said first variable input condition responsive means acting through said pin; and a fixed stop engageable with said lever for limiting movement thereof toward said force transmitting lever means in response to the force applied to said lever by said tension spring.

13. Control apparatus as claimed in claim 11 wherein said spring retaining member includes an adjustable member connected to said one end of said tension spring for varying the effective length of said tension spring.

References Cited

UNITED STATES PATENTS

| | | | |
|---|---|---|---|
| 2,564,127 | 8/1951 | Orr | 60—39.28 |
| 2,714,803 | 8/1955 | Abild | 60—39.28 |
| 2,746,242 | 5/1956 | Reed | 60—39.28 X |
| 2,846,846 | 8/1958 | Mock | 60—39.28 |
| 2,939,280 | 6/1960 | Farkas | 60—39.28 |
| 3,172,398 | 3/1965 | Reggio | 60—39.28 X |
| 3,186,167 | 6/1965 | Chute | 60—39.28 |
| 3,240,015 | 3/1966 | Cowles | 60—39.28 |

JULIUS E. WEST, *Primary Examiner.*